United States Patent
Tsuda et al.

(10) Patent No.: US 7,030,527 B2
(45) Date of Patent: Apr. 18, 2006

(54) DATA STORAGE DEVICE WITH MECHANISM TO CONTROL ROTATION OF SPINDLE MOTOR

(75) Inventors: Shingo Tsuda, Kanagawa (JP); Mutsuro Ohta, Kanagawa (JP); Hiroki Kitahori, Kanagawa (JP); Kazutaka Okasaka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/993,601

(22) Filed: Nov. 19, 2004

(65) Prior Publication Data

US 2005/0140220 A1 Jun. 30, 2005

(30) Foreign Application Priority Data

Dec. 25, 2003 (JP) .............................. 2003-429317

(51) Int. Cl.
*H02K 5/24* (2006.01)
*H02K 7/00* (2006.01)
*H02K 11/00* (2006.01)
*H02K 5/16* (2006.01)

(52) U.S. Cl. ...................... 310/90; 310/67 R; 310/90.5; 310/156.04; 310/51; 360/99.08; 360/98.07

(58) Field of Classification Search .............. 310/67 R, 310/90, 51, 90.5, 156.04; 384/119; 360/99.08, 360/99.07
See application file for complete search history.

(56) References Cited

U.S. PATENT DOCUMENTS

| | | | | |
|---|---|---|---|---|
| 4,672,250 A | * | 6/1987 | Seitz | 310/90 |
| 5,559,382 A | * | 9/1996 | Oku et al. | 310/90 |
| 5,831,355 A | * | 11/1998 | Oku | 310/42 |
| 6,836,388 B1 | * | 12/2004 | Nishimura et al. | 360/99.08 |
| 2004/0061404 A1 | * | 4/2004 | Fujii et al. | 310/216 |
| 2004/0160136 A1 | * | 8/2004 | Yoo et al. | 310/90 |
| 2005/0006962 A1 | * | 1/2005 | Horng | 310/51 |
| 2005/0057107 A1 | * | 3/2005 | Xu et al. | 310/67 R |
| 2005/0058374 A1 | * | 3/2005 | Gomyo et al. | 384/119 |

* cited by examiner

*Primary Examiner*—Darren Schuberg
*Assistant Examiner*—Erik Preston
(74) *Attorney, Agent, or Firm*—Townsend and Townsend and Crew LLP

(57) ABSTRACT

Embodiments of the present invention effectively control, by a simple structure, floating of a rotor of a fluid dynamic bearing motor mounted in a hard disk drive. In one embodiment, a base is formed of a magnetic material. The attractive force caused by the magnetic force acts between a bottom of the base and a magnet unit that is constituted of a rotor magnet and a back yoke. This makes it possible to attract a rotor to the base against the buoyant force produced by a thrust bearing, and thereby to effectively control the rotation of the rotor. On the bottom of the base, at a position facing the magnet unit, a convex part protruding from the inner surface of the base is formed in a ring-shape. Adjusting the height, or the width, of the convex part makes it possible to control the magnetic back pressure applied to the rotor.

22 Claims, 7 Drawing Sheets

DATA STORAGE DEVICE WITH MECHANISM TO CONTROL ROTATION OF SPINDLE MOTOR

CROSS-REFERENCES TO RELATED APPLICATIONS

This application claims priority from Japanese Patent Application No. JP2003-429317, filed Dec. 25, 2003, the entire disclosure of which is incorporated herein by reference.

BACKGROUND OF THE INVENTION

The present invention relates to a data storage device, and more particularly to a data storage device suitable for a hard disk drive.

As a data storage device, various devices each using a medium are known—there are various kinds of media such as an optical disk and a magnetic tape. Among them, a hard disk drive has achieved widespread use as a storage device of a computer, serving as one of the indispensable storage devices for current computer systems. In addition, the superior characteristics of the hard disk drive are more and more widening the use of the hard disk drive; more specifically, the hard disk drive is applied not only to the computer systems, but also to, for example, a moving image recorder/player, a car navigation system, and a removable memory used for a digital camera, etc.

The hard disk drive comprises the following components: a magnetic disk for storing data; a head for reading/writing data from/to the magnetic disk; and an actuator for moving the head to a desired position on the magnetic disk. When a voice coil motor drives the actuator, the actuator pivotally moves about a pivot, which causes the head to move in the radial direction on the magnetic disk that is rotating. This permits the head to access a desired track formed on the magnetic disk, and thereby to read/write data.

The actuator includes a suspension with elasticity, and the head is firmly fixed to the suspension. The head includes a write/read thin film element and a slider. By balancing the pressure produced by air viscosity between the rotating magnetic disk and an ABS (Air Bearing Surface) surface of the slider, which faces the magnetic disk, against the pressure applied by the actuator in a direction toward the magnetic disk, the magnetic head floats off the magnetic disk with a constant gap being kept.

The spindle motor secured to the base rotates the magnetic disk at a given speed. FIG. 7 is a cross-sectional view partially illustrating how a spindle motor 701 used for the conventional hard disk drive and the base 702 for receiving the spindle motor are configured. The spindle motor 701 is a fluid dynamic bearing motor in which oil is used for a bearing. From the standpoint of its silent operation, the durability, and the like, instead of the ball bearing motor, the fluid dynamic bearing motor is more and more adopted for the hard disk drives. In FIG. 7, the spindle motor 701 has an axial rotation structure in which a rotating shaft (shaft) is secured to the rotating hub side. The base 702 is formed by casting aluminum alloy. In addition, with the object of achieving a desired shape with required accuracy, a part of the base 702 is formed by cutting. It is to be noted that one example of the fluid dynamic bearing motor is disclosed in Japanese Patent Laid-Open No. 2003-143803, for example.

In FIG. 7, reference numeral 703 denotes a hub to which a magnetic disk is secured. In an example shown in FIG. 7, the hub 703 is formed of magnetic metal such as SUS. Reference numeral 704 denotes a rotating shaft. The shaft 704 is secured to the center of the inner surface of the hub 703. Reference numeral 705 denotes a rotor magnet. The rotor magnet 705 has a cylindrical shape, and is firmly fixed to the inner surface of the hub 703. The hub 703, the shaft 704, and the rotor magnet 705 constitute a rotor 706 that is formed as one unit. Reference numeral 707 is a sleeve for accommodating the shaft 704.

The sleeve 707 is provided with a bearing hole 707a for accommodating the shaft 704. The shaft 704 is rotatably accommodated in the bearing hole 707a. On the inner surface of the bearing hole 707a, there is formed a radial dynamic pressure groove for producing dynamic pressure. Oil is applied between the shaft 704 and the inner surface of the bearing hole 707a, which allows to serve as a radial bearing 708. On the top surface of the sleeve 707 that is in contact with the inner surface of the hub 703, there is formed a thrust dynamic pressure groove for producing dynamic pressure. Oil is applied between the top surface of the sleeve 707 and the inner surface of the hub 703, which allows to serve as a thrust bearing 709.

Reference numeral 710 denotes a stator coil for applying an electric current to the spindle motor. Reference numeral 711 denotes a stator core. The stator coil 710 is wound around the stator core 711. The stator core 711 is placed inside the rotor magnet 705 so that the stator core 711 faces the rotor magnet 705. The stator coil 710 and the stator core 711 constitute the stator 712 that is formed as one unit.

When the stator coil 710 is energized, the rotating magnetic field generated by the stator 712 produces torque, and consequently the rotor 706 starts rotating. In response to the rotation of the rotor 706, a plurality of radial dynamic pressure grooves formed on the inner surface of the bearing hole 707a create pressure on the radial bearing 708. In a similar manner, the plurality of thrust dynamic pressure grooves formed on the top surface of the sleeve 707, which is in contact with the inner surface of the hub, create pressure on the thrust bearing 709, and thereby the hub 703 floats off the top surface of the sleeve 707. As a result, the rotor 706 can rotate in a non-contact state.

As for the spindle motor 701, the thrust bearing 709 in a direction of the rotating shaft (vertical direction in FIG. 7) is formed only between the top surface of the sleeve 707 and the inner surface of the hub 703. For this reason, the buoyant force is applied to the rotor 706 in the upward direction (in a direction from the base 702 toward the hub 703). For the purpose of forming the magnetic back pressure that balances against this buoyant force, a bias plate 713 made of a magnetic material is firmly fixed to the bottom of the base 702. By use of the magnetic back pressure produced between the rotor magnet 705 and the bias plate 713, it is possible to attract the rotor 706 toward the base 702 against the buoyant force by the thrust bearing 709, and thereby to control the rotation of the rotor 706.

In the conventional hard disk drive described above, forming the thrust bearing 709 only on one side in the direction of the rotating shaft renders it possible to make the hard disk drive thin. However, because the base 702 is formed of non-magnetic material aluminum alloy, the bias plate 713 for controlling the floating of the hub 703 in the thrust bearing 709 needs to be formed separately from the base 702.

In another case, the base 702 in the conventional hard disk drive is formed by casting. Because the floating of the hub is determined by a gap between the bias plate 713 and the rotor magnet 705, a mounting surface of the bias plate 713 on the base 702 is required to be formed with a higher degree of accuracy. Accordingly, a fixing area of the base 702, to which the bias plate 713 is fixed, is required to be formed by cutting after casting, which makes the manufacturing process more and more complicated.

BRIEF SUMMARY OF THE INVENTION

A feature of the present invention is to effectively control floating of the rotor in the fluid dynamic bearing motor. Another feature of the present invention is to make thin the fluid dynamic bearing motor and the storage disk drive. Still another feature of the present invention is to simplify a configuration of the storage disk drive that utilizes the fluid dynamic bearing motor. A further feature of the present invention is to improve the efficiency in producing the storage disk drive.

According to a first aspect of the present invention, there is provided a data storage device. The data storage device comprises a storage disk for storing data; a fluid dynamic bearing motor for rotating the storage disk; and a base for receiving the fluid dynamic bearing motor. The fluid dynamic bearing motor comprises a stator that is secured to the base; and a rotor that rotates in response to a rotating magnetic force applied by the stator, the rotor having a magnet unit. The base is made of a magnetic material having a convex part that is formed at a position facing the magnet unit. Providing the magnetic material base with the convex part at a position facing the magnet unit enables easier control of the magnetic back pressure applied to the rotor.

It is desirable that the base be formed by pressing a magnetic material plate. The presswork can increase the efficiency in production. It is desirable that the convex part be formed into a shape having rotational symmetry about the rotating shaft of the fluid dynamic bearing motor; or it is desirable that the convex part be formed in a ring-shape surrounding the rotating shaft of the fluid dynamic bearing motor. This makes it possible to apply uniform force to the rotor.

The base has the pressed convex part at a position facing the magnet unit so as to control floating of the rotor. In addition, the convex part has the height that is adjusted so as to balance against the buoyant force given to the rotor by the thrust bearing of the fluid dynamic bearing motor. It is possible to effectively control floating of the rotor by adjusting the height of the convex part. The fact that providing the base with the convex part enables the adjustment of a gap away from the magnet unit is useful particularly in a case where the magnetic center of the rotor exists at a position further away from the base as compared with a position at which the magnetic center of the stator exists.

According to a second aspect of the present invention, there is provided a data storage device. The data storage device comprises a storage disk for storing data; a fluid dynamic bearing motor for rotating the storage disk, the fluid dynamic bearing motor comprising a stator for producing a rotating magnetic force, and a rotor that rotates in response to a rotating magnetic force applied by the stator, the rotor having a magnet unit; and a base that receives the fluid dynamic bearing motor, and that is formed of a magnetic material, the base having a convex part at a position facing the magnet unit so as to control floating of the rotor. Providing the magnetic material base with the convex part at the position facing the magnet unit enables effective control of floating of the rotor by the magnetic back pressure.

According to a third aspect of the present invention, there is provided a data storage device. The data storage device comprises a storage disk for storing data; a fluid dynamic bearing motor for rotating the storage disk; and a base for receiving the fluid dynamic bearing motor. The fluid dynamic bearing motor comprises a stator that is secured to the base; and a rotor that rotates in response to the rotating magnetic force applied by the stator. The rotor comprises a hub to which the storage disk is secured, and in which a concave part is formed on a surface facing the bottom of the base; and a magnet unit that is secured to the hub. A hub-side end of the magnet unit is received in the concave part of the hub so that the distance between a base-side end of the magnet unit and the bottom of the base is adjusted. Because the hub has the concave part for accommodating the edge of the magnet unit, it is possible to effectively adjust the distance between the bottom of the base and the magnet unit.

If the base is formed of a magnetic material, and if the magnetic center of the rotor exists at a position further away from the bottom of the base as compared with a position at which the magnetic center of the stator exists, adjusting the distance between the base side end of the magnet unit and the bottom of the base makes it possible to adjust the magnetic back pressure applied to the magnet unit. In addition, it is desirable that the base be formed by pressing a magnetic material plate.

According to a fourth aspect of the present invention, there is provided a data storage device. The data storage device comprises: a storage disk for storing data; a spindle motor for rotating the storage disk; a base that receives the spindle motor, wherein the base is formed by presswork; and a bushing that is formed independently of the base with the object of securing the spindle motor to the bottom of the base, and that is firmly fixed to both the bottom of the base and the spindle motor. By use of the bushing, it is possible to effectively secure the spindle motor to the base formed by the presswork.

It is desirable that the spindle motor comprise a hub to which the storage disk is secured, a rotor magnet secured inside the hub, and a stator secured inside the rotor magnet at a position facing the rotor magnet, and that the bushing be firmly fixed to the stator and the bottom of the base. By use of the bushing, it is possible to reliably secure the stator to the bottom of the base formed by the presswork.

According to embodiments of the present invention, it is possible to effectively control the spindle motor.

DETAILED DESCRIPTION OF THE INVENTION

Figure 1:
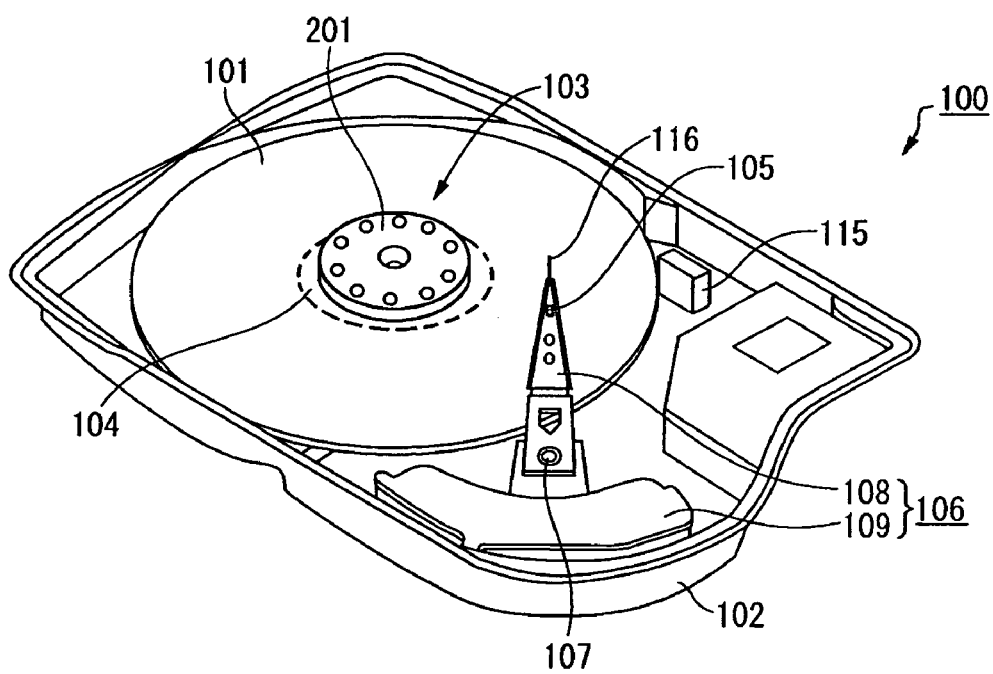
FIG. 1 is a perspective view schematically illustrating a configuration of a hard disk drive according to an embodiment of the present invention.

Embodiments to which the present invention can be applied will be described as below. The description given below is used to explain the embodiments of the present invention. The present invention, therefore, is not limited to the embodiments described below. For the sake of clarification of the description, the description and the drawings, which are disclosed hereinafter, shall be properly abbreviated, omitted, and simplified. In addition, a person skilled in the art can easily change, add, or convert each element of the embodiments within the scope of the present invention.

Incidentally, in each of the drawings, the same elements are designated by similar reference numerals. Therefore, for the sake of clarification of the description, duplicated description will be omitted.

FIG. 1 is a perspective view schematically illustrating a configuration of a hard disk drive 100 according to this embodiment. In FIG. 1, reference numeral 101 denotes a magnetic disk, which is a nonvolatile storage disk that stores data by magnetizing a magnetic layer. The magnetic disk 101 can be formed of an aluminum substrate or a glass substrate. Reference numeral 102 denotes a box-shaped base having an opening in its upper part, which accommodates components of the hard disk drive 100. In this embodiment, the base 102 is formed by pressing a magnetic material such as steel (SPCC). Steel, magnetic stainless steel, or the like, can be used as the magnetic material. The base 102 will be described in detail later. By use of a gasket (not illustrated) such as fluorine rubber, the base 102 is secured to a cover (not illustrated) for closing the upper opening of the base 102 so that a disk enclosure is formed. With the components of the hard disk drive 100 sealed, the disk enclosure can accommodate the components.

Reference numeral 103 denotes a spindle motor secured to the base; and reference numeral 104 denotes a hub provided on the spindle motor 103. A configuration of the spindle motor 103 will be described in detail later. Reference numeral 105 denotes a head by which data is written to, and/or read from, the magnetic disk 101. The data is input/output from/to a host (not illustrated). The head 105 has a write element for converting an electric signal into a magnetic field according to data to be stored in the magnetic disk 101, and/or a read element for converting a magnetic field received from the magnetic disk 101 into an electric signal. The head 105 also has a slider on which the write element and/or the read element are formed.

Reference numeral 106 denotes an actuator for supporting the head 105. The actuator 106 is held so that the actuator 106 can pivotally move about a pivoting shaft 107. The actuator 106 includes an actuator arm 108 and a VCM (voice coil motor) 109. Reference numeral 115 denotes a ramp mechanism that retracts the head 105 from the magnetic disk 101 when the rotation of the magnetic disk 101 stops. Reference numeral 116 denotes a tab formed at the tip of a suspension 110.

By use of a top clamp 201, the magnetic disk 101 is secured to the hub 104 of the spindle motor 103 that is secured to the bottom surface of the base 102. The magnetic disk 101 is driven and rotated by the spindle motor 103 at a given rotational speed. When the hard disk drive 100 is not operated, the magnetic disk 101 stands still. In response to a driving signal supplied from a controller (not illustrated) to a flat coil, the VCM 109 pivotally moves the actuator arm 108 about the pivot shaft 107, and thereby the head 105 can be moved to a position above the magnetic disk 101 or to the outside of the magnetic disk 101.

A circuit board (not illustrated) is mounted to the outside (under surface) of the base 102. The circuit board typically has a rectangular shape, which is large enough to cover a half of the outside of the base 102. Electric power for driving the motor is supplied from the circuit board to the spindle motor 103; and input/output of a signal, and the like, are performed between the circuit board and the spindle motor 103. Power to a coil used for the VCM 109 and electric power used for reading of the head 105 are supplied from the circuit board to the actuator 106; and input/output of a signal is performed between the circuit board and the actuator 106. The supply and the input/output between the circuit board and the actuator 106 are performed through a FPC (Flexible Printed Circuit).

With the object of reading/writing data from/to the magnetic disk 101, the actuator 106 moves the head 105 to a position above a data area of the magnetic disk 101 that is rotating. The pivotal move of the actuator 106 causes the head 105 to move in the radial direction on the surface of the magnetic disk 101. This permits the head 105 to access a desired track. By balancing the pressure produced by air viscosity between the rotating magnetic disk 101 and an ABS (Air Bearing Surface) surface of the slider, which faces the magnetic disk 101, against the pressure applied by the actuator 106 in a direction toward the magnetic disk 101, the head 105 floats off the magnetic disk 101 with a constant gap kept therebetween.

The hard disk drive 100 according to the present embodiment is a disk drive that is called a load/unload disk drive. If the rotation of the magnetic disk 101 stops, the head 105 contacts the surface of the magnetic disk 101, causing absorption phenomenon. This produces problems such as the occurrence of a flaw in the data area, and inability to rotate the magnetic disk. Therefore, when the rotation of the magnetic disk 101 stops, the actuator 106 retracts the head 105 from the data area into the ramp mechanism 115.

The actuator 106 pivotally moves in the direction toward the ramp mechanism 115, which causes the tab 116 at the tip of the actuator 106 to slide and move on the surface of the ramp mechanism 115 until the tab 116 sits on a parking surface of the ramp mechanism 115. This is how the head 105 is unloaded. When the head 105 is loaded, the actuator 106 supported by the parking surface leaves the ramp mechanism 1115, and then moves above the surface of the magnetic disk 101. Incidentally, as for the CSS (Contact Start and Stop) hard disk drive, the head 105 retracts into a CSS zone that is formed on the inner circumference side of the magnetic disk.

It is to be noted that although the hard disk drive according to this embodiment includes one piece of the magnetic disk 101, the present invention can also be applied to a hard disk drive including a plurality of magnetic disks. When data is stored on both sides of the plurality of magnetic disks, the plurality of magnetic disks are integrally held by the hub 104 at given intervals in a direction of the rotating shaft of the spindle motor 103. Actuator arms for holding each head which scans each storing surface are prepared. Here, the number of the actuator arms to be prepared is equal to the number of the storing surfaces. Then, the actuator arms are secured to the actuator 106 at positions where they overlap one another at given intervals from the actuator arms 108.

Figure 2:
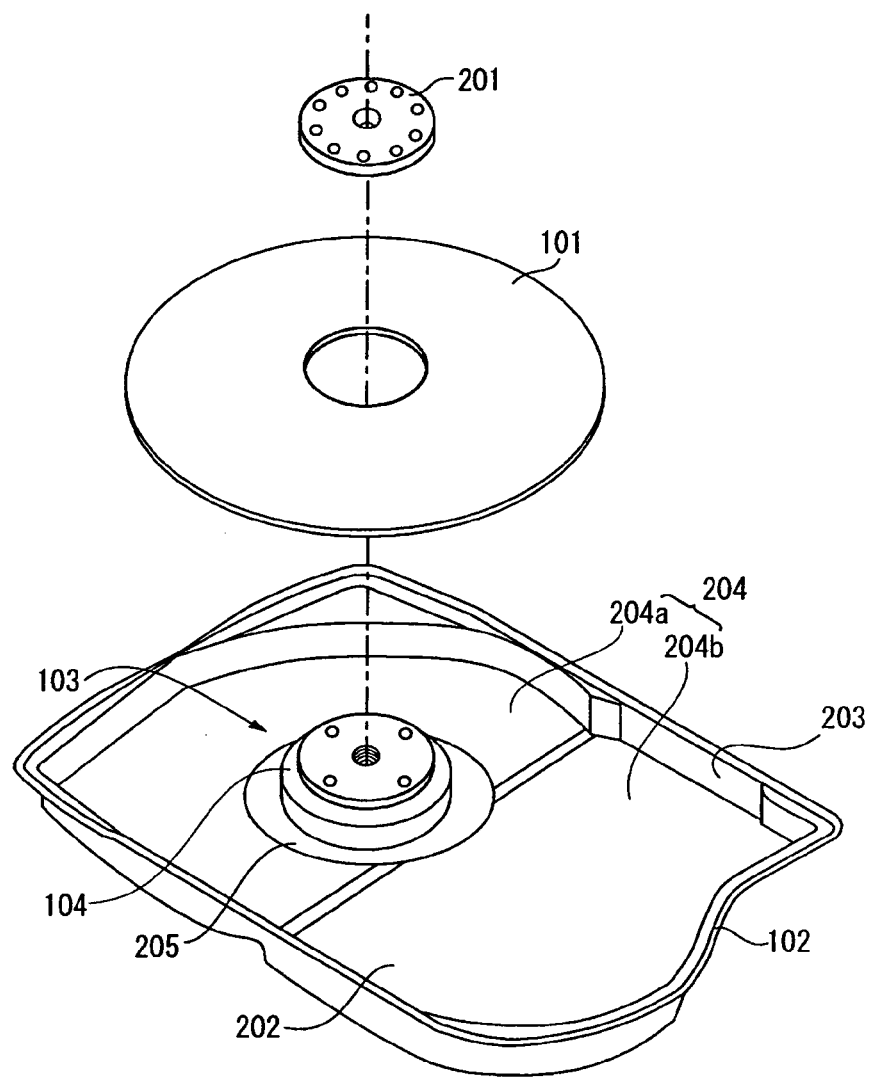
FIG. 2 is an exploded perspective view partially illustrating a configuration of the hard disk drive of FIG. 1.

FIG. 2 is an exploded perspective view partially illustrating a configuration of the hard disk drive 100 according to this embodiment. In FIG. 2, the base 102, the spindle motor 103, the magnetic disk 101, and the top clamp 201 are illustrated as the components of the hard disk drive 100. As shown in FIG. 2, the base 102 comprises: a bottom 202 to which the components of the hard disk drive 100 are mounted; and a wall 203 that is formed so as to surround the circumference of the bottom.

An inside-the-base space 204 surrounded by the wall 203 has a plurality of areas as follows: a disk accommodation area 204a for accommodating a disk assembly that comprises the magnetic disk 101 and the spindle motor 103 for driving and rotating the magnetic disk; and an actuator accommodation area 204b for accommodating the actuator 106 that is used to move the head 105 to a desired position above the magnetic disk or to a desired position away from the magnetic disk 101.

The spindle motor 103 is placed in a concave part 205 that is formed substantially in the center of the bottom 202 of the disk accommodation area 204a in a direction from the inside to the outside of the base 102. At this position, the spindle motor 103 is secured to the bottom 202 of the base 102. The magnetic disk 101 is mounted on the hub 104 of the spindle motor 103. Both the top clamp 201 and the hub 104, which are screwed, hold the magnetic disk 101 tight, so that the magnetic disk 101 is secured to the spindle motor 103.

The hard disk drive 100 according to this embodiment is provided with the base 102 which is formed by pressing a magnetic material plate such as SPCC. For the presswork, a member is pressed using a pressing machine; more specifically, punching, die forging, plate bending, or the like, is performed. The presswork makes it possible to mold into a desired form a metal plate made by rolling. Thus, a molded workpiece is molded according to the form of a mold. Punching, drilling, drawing, bending, and the like, are known as a processing method. The presswork is easier than casting, and is also a desirable processing method from the standpoint of the production cost.

Figure 3:
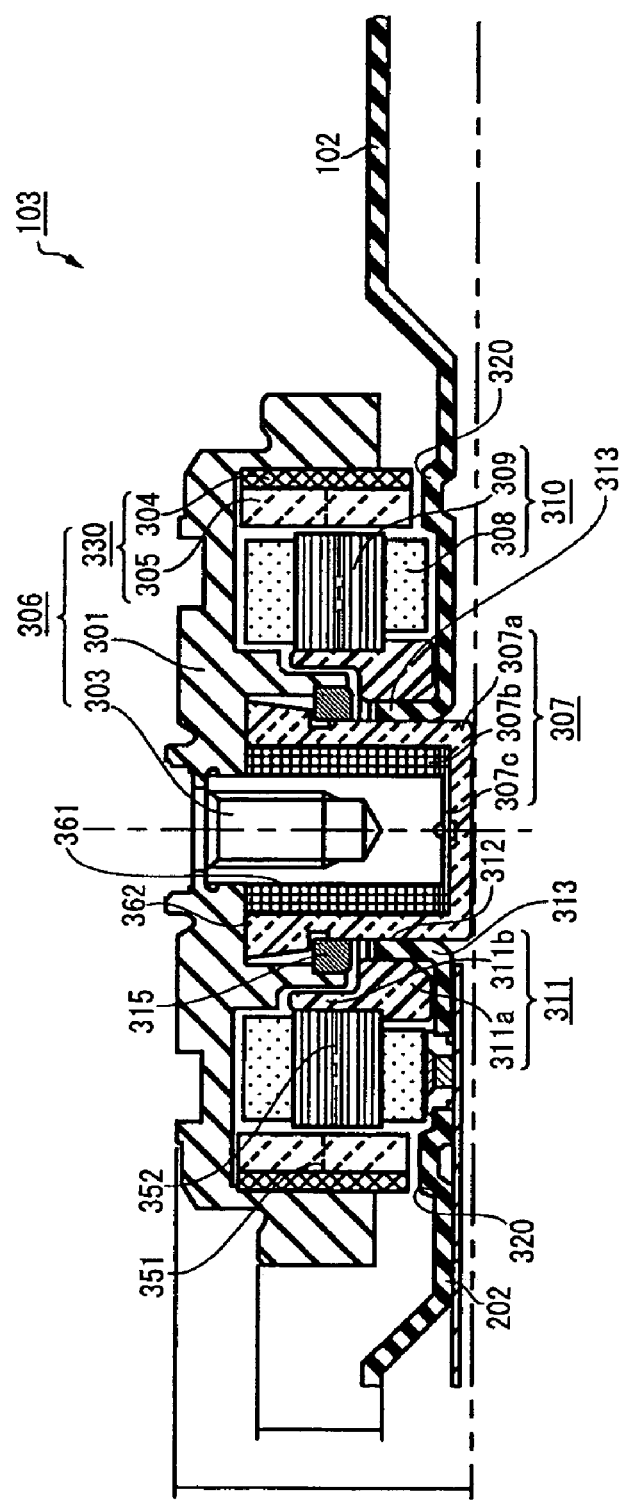
FIG. 3 is a cross-sectional view illustrating how a spindle motor and a base are configured according to an embodiment of the invention.
Figure 4:
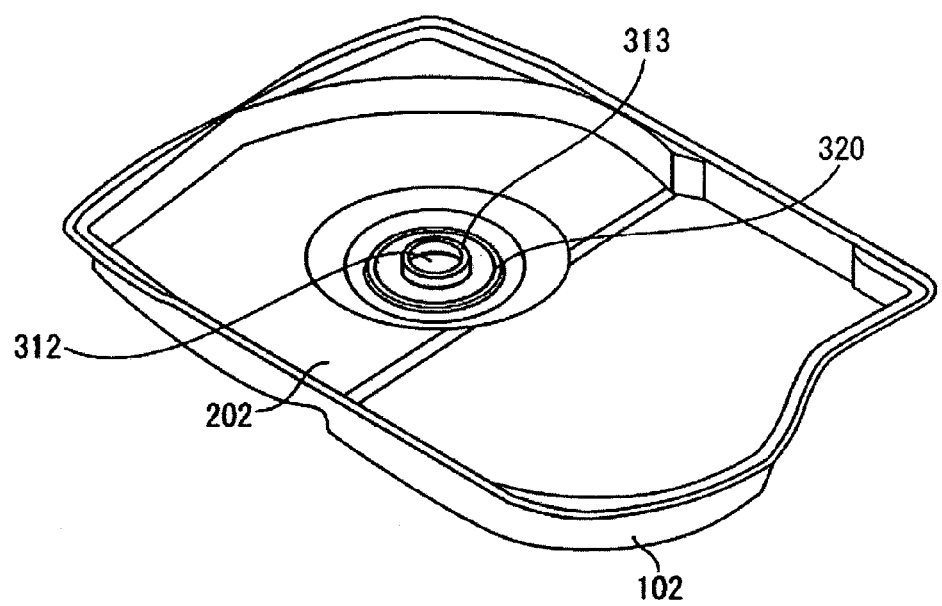
FIG. 4 is a perspective view illustrating a configuration of the base of FIG. 3.

FIG. 3 is a cross-sectional view partially illustrating a configuration of the base 102 that receives the spindle motor 103 in this embodiment. In addition, FIG. 4 is a perspective view illustrating a configuration of the base 102. The spindle motor 103 in this embodiment is a fluid dynamic bearing motor. The fluid dynamic bearing motor is a motor in which fluid such as oil is used for a bearing of a rotating shaft. In the bearing, only the fluid exists between a rotating unit and a fixed unit. Accordingly, the rotating unit can rotate smoothly.

The fluid dynamic bearing motor contributes to a longer life of the motor as compared with a ball bearing motor, and is also superior in providing silent operation (low noise). Moreover, the fluid dynamic bearing motor can reduce oscillations by use of the damping effect on high order oscillations. The fluid dynamic bearing motor, therefore, is superior also from the standpoint of the positioning accuracy. The spindle motor 103 shown in this embodiment has an in-hub structure that includes inside a hub a stator and a rotor magnet. Additionally, the spindle motor has an axial rotation structure in which a rotating shaft is secured to the rotating hub side.

In FIG. 3, reference numeral 301 denotes a hub to which a magnetic disk (not illustrated) is secured. In this example, the hub 301 is formed of aluminum. If the magnetic disk is formed of an aluminum substrate, the hub 301 made of aluminum is used from the standpoint of preventing distortion caused by the difference in thermal expansion. When the magnetic disk is formed of a glass substrate, the hub 301 can be formed of SUS, or the like. The hub 301 is a box-shaped body having a cylindrical side wall and an opening on one side, and is placed so that the opening (inner surface of the hub) faces the base 102.

A central open area of the magnetic disk is fitted to the hub 301, and thereby the magnetic disk is secured to the outside of the hub 301. Reference numeral 303 denotes a rotating shaft. The shaft 303 is secured to the center of the inner surface of the hub 301. Reference numeral 304 denotes a back yoke for amplifying the attractive force of a magnet. The back yoke 304 is made of a magnetic material such as iron, and is formed into a cylindrical shape. The back yoke 304 is firmly fixed to the inner side of the hub 301. Reference numeral 305 denotes a rotor magnet. The rotor magnet 305 has a cylindrical shape, and is firmly fixed to the inner surface of the back yoke 304. The hub 301, the shaft 303, the back yoke 304, and the rotor magnet 305 constitute a rotor 306 that is formed as one unit. It is to be noted that if the hub 301 is formed of a magnetic material, the back yoke 304 can be omitted.

Reference numeral 307 is a flange for accommodating the shaft 303. The flange 307 is constituted of two members. To be more specific, the flange 307 has an outer flange 307a, and an inner flange 307b that is fitted into the inside of the outer flange 307a. The flange 307 is a box-shaped body having a cylindrical side wall and an opening on one side. A bearing hole 307c for accommodating the shaft 303 is formed inside the flange 307. The shaft 303 is rotatably accommodated in the bearing hole 307c.

In the inner surface of the bearing hole 307c of the flange, there is formed a plurality of radial dynamic pressure grooves for producing dynamic pressure. Lubricant is applied between the shaft 303 and the inner surface of the bearing hole 307c of the flange, which allows to serve as a radial bearing 361. On the opening side of the flange 307, the top surface of the flange 307 is in contact with the inner surface of the hub 301 in a state in which both surfaces face each other. On the top surface of the flange 307 that is in contact with the inner surface of the hub 301, there is formed a plurality of thrust dynamic pressure grooves for producing dynamic pressure. Lubricant is applied between the top surface of the flange 307 and the inner surface of the hub, which allows to serve as a thrust bearing 362.

Reference numeral 308 denotes a stator coil for applying an electric current to the spindle motor. Reference numeral 309 denotes a stator core used to lead magnetic flux to the coil. The stator core is typically formed by laminating a plurality of plates, each of which is formed of a high permeability material. The stator coil 308 is wound around the stator core 309. The spindle motor 103 includes the plurality of stator cores 309 disposed in the circumferential direction. The stator core 309 is placed inside the rotor magnet 305 so that the stator core 309 faces the rotor magnet 305. The stator coil 308 and the stator core 309 constitute the stator 310 that is formed as one unit.

Reference numeral 311 denotes a stator bushing that holds the stator 310 to secure the stator 310 to the inside of the base 102. Reference numeral 315 denotes is a stopper pin used to prevent the rotor 306 from disengaging. The stator bushing 311 is placed on the outer circumferential side of the flange 307. The stator bushing 311 is formed of a member different from that of the base 102. It is possible to secure the stator 310 to the inner surface of the base 102 by securing the stator bushing 311 to both the inner surface of the base 102 and the stator 310. The stator bushing 311 can be secured to both the base 102 and the stator 310 by use of an adhesive.

The stator bushing 311 is a ring-shaped metal structure having a through hole in the center. The stator bushing 311 has a small diameter part 311a, the inside diameter (through hole diameter) of which is small, and a large diameter part 311b, the inside diameter of which is large. A part of the hub 301 is inserted into a space defined by the large diameter part 311b. In the bottom of the base 202, there is formed a circular hole 312 into which the flange 307 is inserted. Further, there is formed a wall 313 protruding from the bottom to the inside of the base 102 so as to surround the hole 312.

The outer circumferential side (bottom inner surface side) of the wall 313 is partially in contact with the inner surface side of the through hole of the stator bushing 311. Both of the sides are firmly fixed. As shown in FIG. 3, the inner surface of the small diameter part 311a of the stator bushing 311 contacts the outer circumferential surface of the wall 313. Both of the surfaces are firmly fixed by use of an adhesive, or the like, if necessary. A step is formed in the outer circumferential surface of the stator bushing 311 so that the stator 310 is well fitted into the stator bushing 311. The outer circumferential surface of the stator bushing 311 contacts the flange side of the stator core 309. Both of them are firmly fixed by use of an adhesive, or the like. The bottom surface of the stator bushing 311 is in contact with the inner surface of the bottom 202 of the base 102. Both of the surfaces are firmly fixed by use of an adhesive, or the like, if necessary.

The base 102 is formed by pressing a steel plate, the thickness of which is substantially uniform. Accordingly, it is difficult to form the base 102 itself into a complicated shape so as to hold the stator 310. In this embodiment, the stator bushing 311 for holding the stator 310 is prepared as a member different from that of the base 102. Securing the stator 310 to the base 102 through the stator bushing 311 makes it possible to effectively hold the stator 310 in the base 102, and thereby to effectively secure the stator 310 to the base 102.

Energizing the stator coil 308 causes the stator 310 to generate the rotating magnetic field for rotating the rotor 306. The magnetic field generated by the stator 310 produces torque, which causes the rotor 306 to start rotating. As the result of the rotation of the rotor 306, the plurality of radial dynamic pressure grooves formed in the inner surface of the flange bearing hole 307c gather the lubricant applied between the inner circumferential surface of the flange 307 and the outer circumferential surface of the shaft 303. In this time, pressure is produced by the pumping action. Likewise, the plurality of thrust dynamic pressure grooves formed on the top surface of the flange 307 which is in contact with the inner surface of the hub 302 gather the lubricant applied between the top surface of the flange 307 and the inner surfaces of the hub 302, and consequently pressure is produced by the pumping action. The pressure causes the hub 302 to float from the flange 307. As a result, the rotor 306 can rotate in a state in which the rotor 306 is not in contact with the flange 307.

The spindle motor 103 according to this embodiment is provided with a thrust bearing 362 in a direction of the rotating shaft (vertical direction in FIG. 3) which is formed only on the top surface of the flange. Thus, forming the thrust bearing 362 only on one surface in the direction of the rotating shaft makes it possible to make the spindle motor 103 thin. However, the thrust bearing 362 applies to the rotor 306 the buoyant force in the upward direction, that is to say, force in a direction going away from the bottom surface of the base 102.

In the case of the hard disk drive 100 according to this embodiment, the base 102 is formed of a magnetic material. The attractive force caused by the magnetic force acts between the bottom 202 of the base 102 and a magnet unit 330 that is constituted of the rotor magnet 305 and the back yoke 304. This makes it possible to attract the rotor 306 to the base 102 against the buoyant force produced by the thrust bearing 362, and thereby to effectively control the rotation of the rotor 306.

In order to effectively control the rotation without hindering the rotation of the rotor 306, it is important to adjust the strength of the attractive force acting between the base 102 and the rotor 306, and thereby to control the floating of the rotor 306. In this embodiment, on the bottom 202 of the base 102, at a position facing the magnet unit 330, there is formed a convex part 320 protruding from the inner surface of the base 102. As shown in FIG. 4, the convex part 320 is formed into a rib shape extending in the circumferential direction so that the convex part 320 faces the magnet unit 330.

In addition, the convex part 320 is formed in a ring-shape so as to correspond to the shape of the magnet unit 330. The top surface of the convex part 320 can be formed in a planar or curved surface. Adjusting the height, or the width (length in the radial direction), of the convex part 320 makes it possible to control the magnetic back pressure applied to the rotor 306. In particular, the height of the convex part 320, or the size of the gap between the convex part 320 and the magnet unit 330, is an important element for adjusting the produced attractive force (floating of the hub 301).

In FIG. 3, lines 351, 352 indicate the magnetic center of the magnet unit 330 and the magnetic center of the stator 310 respectively. As understood from FIG. 3, the magnetic center of the magnet unit 330 does not coincide with the magnetic center of the stator 310. The magnetic center of the magnet unit 330 deviates in the upward direction. In other words, it deviates in a direction going away from the bottom surface of the base 102. Here, the base 102 in this embodiment is formed of a magnetic material with high permeability. Accordingly, it can be thought that the deviation is caused by the magnetic material base 102 exerting a large influence on the magnetic field formed by the stator 310 and the rotor 306 in a magnetic circuit.

Thus, because a position of the magnet unit 330 deviates from the stator 310 with respect to the hub 301, a gap between the bottom of the base 102 and the magnet unit 330 becomes large. Accordingly, if the bottom 202 of the base 102 is flat, it is thought that the attractive force required for the floating control of the rotor 306 cannot be obtained. As described above, because the base 102 in this embodiment includes the convex part 320 protruding toward the magnet unit 330, it is possible to adjust the size of the gap between the magnet unit 330 and the convex part 320, which enables the effective control of required magnetic back pressure.

In another case, the base 102 in this embodiment is formed by pressing a steel sheet. When the base 102 is formed by presswork, it is in general difficult to provide a specific height for a flat surface with a high degree of accuracy. Accordingly, in order to perform the gap control between the magnet unit 330 and the bottom of the base 102 with required accuracy, it is desirable to form a part facing the magnet unit 330 into a convex or concave shape by the presswork. Because the convex part 320 is formed on the base 102 in this embodiment, a large effect can be achieved also from the standpoint of the accuracy of the gap control.

Figure 5:
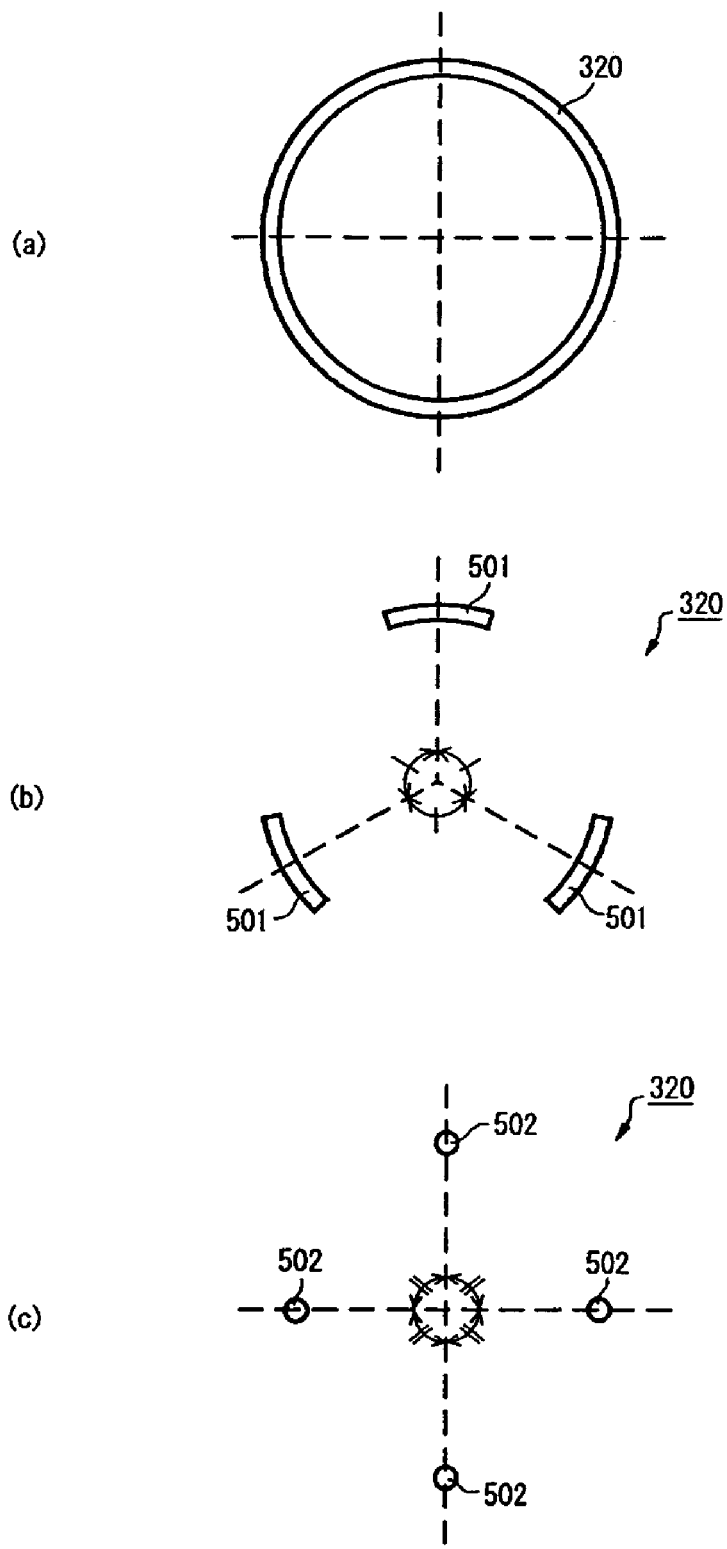
FIGS. 5A, 5B, 5C are plan views illustrating some examples of a shape of a convex part formed on the base of FIG. 3.

Incidentally, in the above description, the convex part 320 is formed in a ring-shape. However, the base 102 can have a plurality of separated convex parts at a position facing the magnet unit 330. FIGS. 5A, 5B, 5C illustrate some examples of a shape of the convex part 320 that is formed at a position facing the magnet unit 330, and that controls the magnetic back pressure. FIG. 5A is a diagram illustrating the ring-shaped convex part 320. Besides them, as a shape of the convex part 320, for example, the following shapes are possible: as shown in FIG. 5B, it is possible to configure the convex part 320 by the plurality of rib-shaped convex parts 501; as shown in FIG. 5C, it is possible to configure the convex part 320 by a plurality of point-shaped convex parts 502; and the like. For the purpose of applying uniform force to the rotor 306, it is desirable that the convex part 320 be formed so as to have rotational symmetry about the rotating shaft of the rotor 306. In addition, from a similar point of view, instead of configuring the convex part 320 by the plurality of separated convex parts, it is more desirable to form the convex part 320 in a ring-shape as shown in FIG. 5A.

Figure 6:
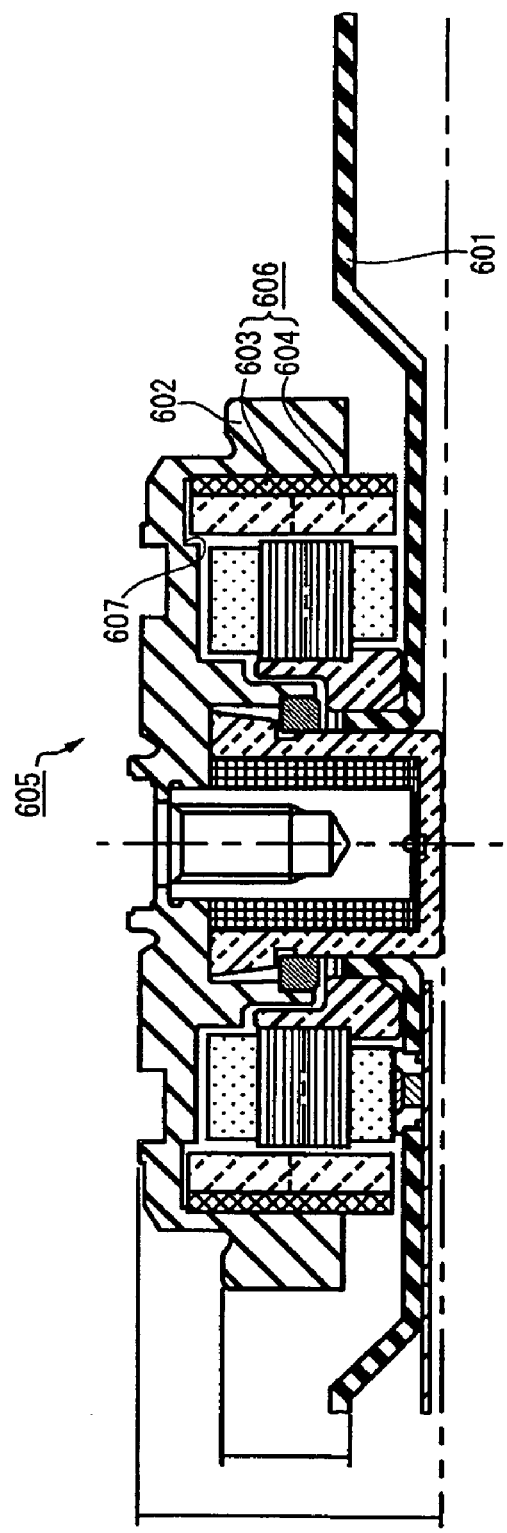
FIG. 6 is a cross-sectional view illustrating how a spindle motor and a base are configured in another embodiment of the invention.
Figure 7:
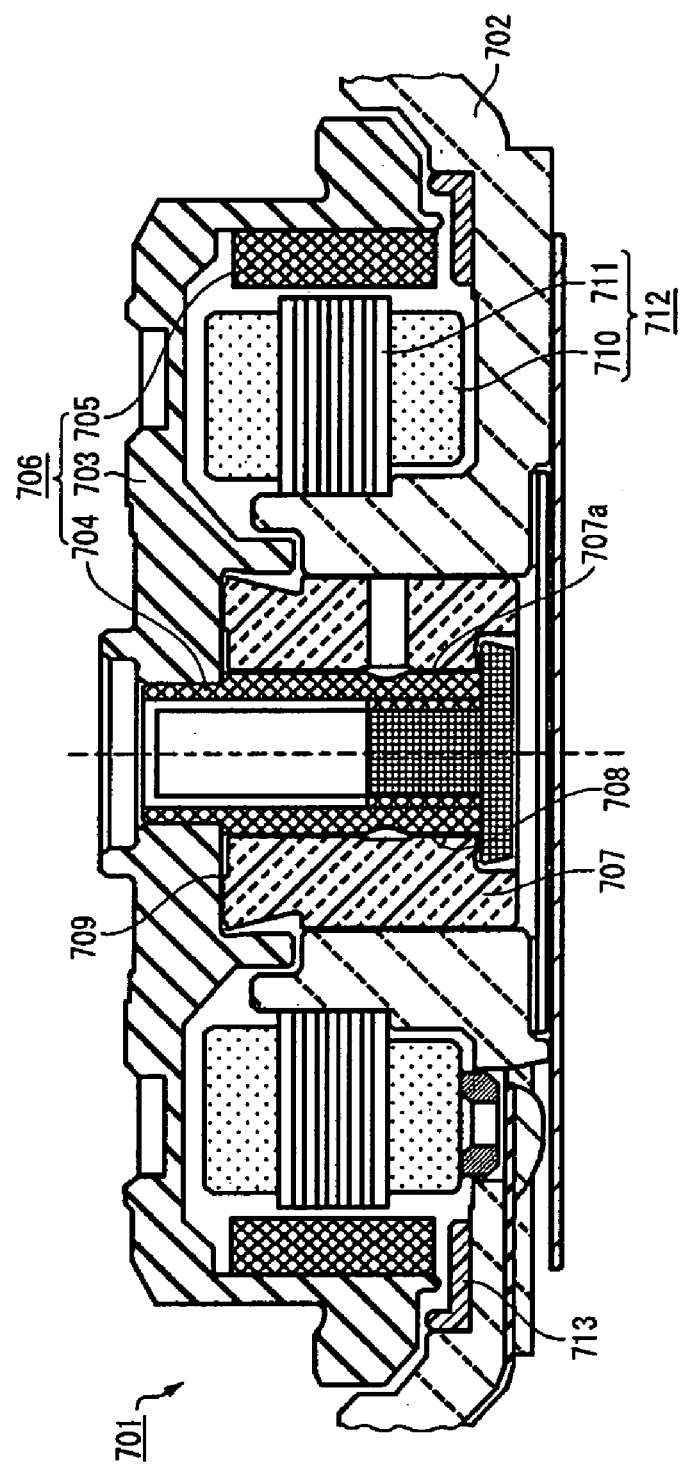
FIG. 7 is a cross-sectional view illustrating how a spindle motor and a base are configured in the prior art.

FIG. 6 is a cross-sectional view illustrating how the spindle motor 103 and the base are configured as another embodiment. In FIG. 6, each element designated by the same reference numeral has substantially the same configuration as that illustrated in FIG. 4. Therefore, duplicated description will be omitted unless it is necessary. In FIG. 6, reference numeral 601 denotes a box-shaped base having an opening in its upper part, which accommodates components of the hard disk drive 100. The base 601 is formed by pressing a magnetic material. Reference numeral 602 denotes a hub to which the magnetic disk 101 is secured. In this example, the hub 602 is formed of aluminum.

Reference numeral 603 denotes a back yoke for amplifying the attractive force of a magnet. The back yoke 603 is made of a magnetic material such as iron, and is formed into a cylindrical shape. The back yoke 603 is firmly fixed to the inner side of the hub 602. Reference numeral 604 denotes a rotor magnet. The rotor magnet 604 has a cylindrical shape, and is firmly fixed to the inner surface of the back yoke 603. The hub 602, the shaft 303, the back yoke 603, and the rotor magnet 604 constitute a rotor 605 that is formed as one unit. The back yoke 603 and the rotor magnet 604 constitute the magnet unit 606.

On the base 601 of this embodiment, the convex part 320 is not formed at a position facing the magnet unit 606. The bottom of the base 601, therefore, is flat at the position facing the magnet unit 606. On the other hand, on the surface (internal top surface) facing the bottom of the base 601 inside the area for accommodating the magnetic circuit of the hub 602, there is formed the concave part 607 for partially accommodating the upper end of the magnet unit 606. The concave part 607 is formed in a ring-shape corresponding to a shape of the magnet unit 606.

As understood with reference to FIGS. 6 and 4, the relationship between the magnetic center of the magnet unit 606 and the magnetic center of the stator 310 in FIG. 6 is similar to that shown in FIG. 4. The distance from the base 601 to the magnetic center of the magnet unit 606 is longer than that from the base 601 to the magnetic center of the stator 310. From the standpoint of how the magnetic circuit of the spindle motor is configured, a position of the magnetic center is an important factor. Therefore, a large change cannot be easily made to the position. On the other hand, the magnet unit 606 in this embodiment is formed so that its height, that is to say, the length in a direction of the rotating shaft, becomes larger than that of the magnet unit 330 and the stator 310 as described with reference to FIG. 4. As a result, it is possible to bring the lower end of the magnet unit 606 close to the bottom of the base 601 without changing the position of the magnetic center of the magnet unit 606, and thereby to achieve desired magnetic attractive force between the magnet unit 606 and the base 601.

As described above, by forming a concave part on the inner surface (surface facing the bottom of the base 601) of the hub 602 to adjust the height of the magnet unit 606, it is possible to control the magnetic back pressure for controlling floating of the rotor 605 without forming a convex part on the bottom of the base 601. Incidentally, while a concave part for accommodating the magnet unit 606 is formed inside the hub 602 on the surface facing the bottom of the base 601, it is possible to form a convex part on the bottom of the base 601 at a position facing the magnet unit 606. It is to be noted that from the standpoint of the accuracy of a gap between the magnet unit 606 and the bottom of the base 601, or with the object of avoiding the hub 602 from becoming thin in thickness, it is desirable to perform the control by forming a convex part on the bottom of the base 601 to adjust the gap as described with reference to FIGS. 4, 5.

Incidentally, in the above description, the base is formed by pressing the steel sheet made of the magnetic material. However, in embodiments of the present invention, the base can also be formed by pressing a steel sheet made of a non-magnetic material such as non-magnetic stainless steel. In this case, firmly fixing a bias plate made of a magnetic material to a position facing the magnet unit on the bottom of the base makes it possible to control floating of the rotor by use of the magnetic force between the bias plate and the magnet unit. Alternatively, the base made of the magnetic material can be formed using a method other than the presswork such as casting.

The spindle motor described above is the in-hub type spindle motor that accommodates the stator and the magnet unit inside the hub. However, the present invention can also be applied to other types of spindle motors such as the inner rotor type spindle motor in which a magnet unit is firmly fixed to the circumference of a hub and a stator is placed outside the hub. The present invention can also be applied to the axial rotation type spindle motor in which a shaft rotates together with a rotor, and to a spindle motor having a shaft fixing structure in which a shaft is secured to the base. The present invention can be applied not only to the hard disk drive, but also to various types of storage disk drives for driving and rotating a storage disk for storing data, such as an optical disk drive.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device comprising:
   a storage disk configured to store data;
   a fluid dynamic bearing motor configured to rotate the storage disk; and
   a base configured to receive the fluid dynamic bearing motor;
   wherein the fluid dynamic bearing motor comprises a stator that is secured to the base; and a rotor that rotates in response to a rotating magnetic force applied by the stator, said rotor having a magnet unit; and
   wherein the base is made of a magnetic material and has a convex part that is formed at a position facing the magnet unit, the convex part being an integrally formed part of the base that is made of the magnetic material, the convex part protruding toward the magnet unit, the convex part being spaced from the magnet unit by a gap which is unoccupied and adjusted to control a magnetic back pressure generated between the convex part of the magnetic base and the magnet unit, the base having a corresponding concave part on a surface opposite from the convex part.

2. A data storage device according to claim 1, wherein the base is formed by pressing a magnetic material plate.

3. A data storage device according to claim 1, wherein the convex part is formed into a shape having rotational symmetry about a rotating shaft of the fluid dynamic bearing motor.

4. A data storage device according to claim 1, wherein the convex part is formed in a ring-shape surrounding the rotating shaft of the fluid dynamic bearing motor.

5. A data storage device according to claim 1, wherein the base has a pressed convex part at a position facing the magnet unit so as to control floating of the rotor.

6. A data storage device according to claim 5, wherein the convex part has a height that is adjusted so as to balance against a buoyant force applied to the rotor by a thrust bearing of the fluid dynamic bearing motor.

7. A data storage device according to claim 1, wherein a magnetic center of the rotor is disposed at a position away from the base as compared with a position at which a magnetic center of the stator is disposed.

8. A data storage device comprising:
   a storage disk configured to store data;
   a fluid dynamic bearing motor configured to rotate the storage disk, said fluid dynamic bearing motor comprising a stator for producing a rotating magnetic force, and a rotor that rotates in response to the rotating magnetic force applied by the stator, said rotor having a magnet unit; and a base that receives the fluid dynamic bearing motor, and that is formed of a magnetic material, said base having a convex part at a position facing the magnet unit, the convex part being spaced from the magnet unit by a gap which is unoccupied and adjusted to control a magnetic back pressure generated between the convex part of the magnetic base and the magnet unit so as to control floating of the rotor, the convex part being an integrally formed part of the base that is made of the magnetic material, the base having a corresponding concave part on a surface opposite from the convex part.

9. A data storage device according to claim 8, wherein the convex part is formed into a shape having rotational symmetry about a rotating shaft of the fluid dynamic bearing motor.

10. A data storage device according to claim 8, wherein the convex part is formed in a ring-shape surrounding the rotating shaft of the fluid dynamic bearing motor.

11. A data storage device according to claim 8, wherein the convex part has a height that is adjusted to balance against a buoyant force applied to the rotor by a thrust bearing of the fluid dynamic bearing motor.

12. A data storage device according to claim 8, wherein a magnetic center of the rotor is disposed at a position away from the base as compared with a position at which a magnetic center of the stator is disposed.

13. A data storage device comprising:

a storage disk configured to store data;

a fluid dynamic bearing motor configured to rotate the storage disk; and a base configured to receive the fluid dynamic bearing motor;

wherein the fluid dynamic bearing motor comprises a stator that is secured to the base; and a rotor that rotates in response to a rotating magnetic force applied by the stator, said rotor having a magnet unit; and wherein the base is made of a magnetic material and has a convex part that is formed at a position facing the magnet unit, the convex part being an integrally formed part of the base that is made of the magnetic material, the convex part protruding toward the magnet unit, the convex part being spaced from the magnet unit by a gap which is unoccupied and adjusted to control a magnetic back pressure generated between the convex part of the magnetic base and the magnet unit, the base having a corresponding concave part on a surface opposite from the convex part;

wherein the rotor comprises a hub to which the storage disk is secured, and in which a concave part is formed on a surface facing the bottom of the base; and a magnet unit that is secured to the hub; and wherein a hub-side end of the magnet unit is received in the concave part of the hub.

14. A data storage device according to claim 13, wherein a magnetic center of the rotor is disposed at a position away from the bottom of the base as compared with a position at which a magnetic center of the stator is disposed.

15. A data storage device according to claim 13, wherein the base is formed by pressing a magnetic material plate.

16. A data storage device according to claim 13, wherein the convex part is formed in a ring-shape surrounding the rotating shaft of the fluid dynamic bearing motor.

17. A data storage device according to claim 13, wherein the convex part is formed into a shape having rotational symmetry about a rotating shaft of the fluid dynamic bearing motor.

18. A data storage device according to claim 13, wherein a distance between a base-side end of the magnet unit and the bottom of the base is adjusted to balance against a buoyant force applied to the rotor by a thrust bearing of the fluid dynamic bearing motor.

19. A data storage device comprising:

a storage disk configured to store data;

a fluid dynamic bearing motor configured to rotate the storage disk; and a base configured to receive the fluid dynamic bearing motor;

wherein the fluid dynamic bearing motor comprises a stator that is secured to the base; and a rotor that rotates in response to a rotating magnetic force applied by the stator, said rotor having a magnet unit; and wherein the base is made of a magnetic material and has a plurality of convex parts that are formed at positions facing the magnet unit, the convex parts protruding toward the magnet unit, the convex parts being spaced from the magnet unit by gaps which are unoccupied and adjusted to control a magnetic back pressure generated between the convex parts of the magnetic base and the magnet unit.

20. A data storage device according to claim 19, wherein the plurality of convex parts include rib-shaped convex parts.

21. A data storage device according to claim 19, wherein the plurality of convex parts include point-shaped convex parts.

22. A data storage device according to claim 19, wherein the plurality of convex parts are arranged to have rotational symmetry about a rotating shaft of the rotor.

\* \* \* \* \*